United States Patent [19]

Vasak et al.

[11] Patent Number: 4,464,351
[45] Date of Patent: Aug. 7, 1984

[54] PROCESS FOR THE THERMAL DESTRUCTION OF SOLID METABLE HALOGENATED WASTE WITH RESULTANT PRODUCTION OF HYDROGEN HALIDE THEREFROM

[75] Inventors: Vladimir Vasak, St. Ives; Joze Sencar, Caringbah; King K. Mok, Concord West, all of Australia

[73] Assignee: ICI Australia Limited, Melbourne, Australia

[21] Appl. No.: 394,916

[22] PCT Filed: Dec. 7, 1981

[86] PCT No.: PCT/AU81/00186
§ 371 Date: Jun. 22, 1982
§ 102(e) Date: Jun. 22, 1982

[87] PCT Pub. No.: WO82/02001
PCT Pub. Date: Jun. 24, 1982

[30] Foreign Application Priority Data
Dec. 8, 1980 [AU] Australia ............................ PE6817

[51] Int. Cl.³ ........................... C01B 7/00; C01B 7/03
[52] U.S. Cl. ...................................... 423/486; 423/488
[58] Field of Search ........... 423/481, 486, 488, 210 M

[56] References Cited

U.S. PATENT DOCUMENTS

| 3,305,309 | 2/1967 | Woodland et al. | 423/481 X |
| 3,445,192 | 5/1969 | Woodland et al. | 423/481 X |
| 3,845,190 | 10/1974 | Yosim et al. | 423/184 |
| 3,933,989 | 1/1976 | Itoh et al. | 423/481 |
| 3,980,758 | 9/1976 | Krombock et al. | 423/488 X |
| 4,140,066 | 2/1979 | Rathjen et al. | 423/481 |
| 4,246,255 | 1/1981 | Grantham | 423/489 |

FOREIGN PATENT DOCUMENTS

| 1430146 | 3/1976 | United Kingdom | 423/481 |
| 2033063 | 5/1980 | United Kingdom | 423/481 |

Primary Examiner—Earl C. Thomas
Attorney, Agent, or Firm—Cushman, Darby & Cushman

[57] ABSTRACT

A process for the thermal destruction of heavy halogenated wastes in a hydrogen/oxygen flame which process comprises passing a mixture of heavy halogenated wastes in the vapor phase and a carrier gas of hydrogen or hydrogen-rich hydrocarbon through burning means provided with gaseous oxygen. Destruction efficiencies of better than 99.999% can be achieved with typical industrial wastes comprising hexachlorobenzene, polychlorinated biphenyls and related compounds.

15 Claims, 3 Drawing Figures

PROCESS FOR THE THERMAL DESTRUCTION OF SOLID METABLE HALOGENATED WASTE WITH RESULTANT PRODUCTION OF HYDROGEN HALIDE THEREFROM

TECHNICAL FIELD

This invention relates to the elimination of environmentally harmful products of manufacturing processes. In particular it relates to processes for the disposal of organic materials such as heavy halogenated wastes.

By heavy halogenated wastes (HHW) we mean halogenated aromatic and aliphatic compounds where the hydrogen to halogen ratio is less than one. Typical aromatic and polyaromatic heavy halogenated wastes include such compounds as hexachlorobenzene (HCB), polychlorinated biphenyls (PCB's) and octachlorostyrene (OCS). Residues or "heavy ends" from industrial processes frequently contain various mixtures of these and halogenated aliphatic compounds such as hexachloroethane (HCE), perchloroethylene (PCE), and hexachlorobutadiene (HCBD). A number of pesticides also fall within this class including some which can persist for very long periods in the environment.

BACKGROUND ART

Incineration has been widely used for the destruction of domestic and industrial waste but these heavy halogenated wastes are not readily handled by this means. The combustion of such wastes is incomplete and harmful amounts can escape into the atmosphere or into soil and water. Furthermore some of the reaction products formed in this partial combustion are also harmful.

Incineration in cement kilns has been proposed but many kiln operators are reluctant to allow their facilities to be used because of the difficulty and uncertainty in ensuring that harmful combustion products are not formed and released adventitiously. No kiln operator in Australia, for example, has even permitted a trial incineration of chlorinated hydrocarbons. Deep land burial has often proved the only option but in countries such as Australia suitable geological formations do not appear to be available.

It is an object of our process to provide a means of combustion of heavy halogenated wastes that gives essentially quantitative destruction of these wastes without the formation of highly toxic or environmentally persistent combustion products. It is a further object of our process to recover the halogen in a useful form.

DISCLOSURE OF INVENTION

Accordingly we provide a process of disposing of organic materials by thermal destruction in a hydrogen/oxygen flame which process comprises passing a mixture of heavy halogenated wastes in the vapour phase and a carrier gas comprising hydrogen through burning means provided with gaseous oxygen.

The carrier gas comprising hydrogen performs three important functions. First, the carrier gas carries the heavy halogenated wastes (HHW) to the burning means. Secondly, the hydrogen ensures a high temperature in the hydrogen/oxygen flame for complete destruction of the HHW. Thirdly, the hydrogen converts the halogen into hydrogen halide.

The preferred carrier gas is hydrogen itself, but other compositions comprising at least 80% v/v of hydrogen may be used. Suitable compositions, for example, are some of the hydrogen-rich hydrocarbon streams found in oil refineries.

Some of the heavy halogenated wastes referred to hereinbefore have a relatively low vapour pressure at ambient temperatures and may in fact be solid. Such materials are heated to a temperature at which an adequate amount of vapour will be continuously removed by the flow of carrier gas. The temperature is controlled so that the amount of HHW vapour is not excessive since this would lead to a low hydrogen/HHW vapour ratio with subsequent incomplete combustion in the flame. While temperature controlling means can be used as a sole form of control of this ratio, in one preferred embodiment of our invention a first stream of carrier gas is passed over the heated chlorinated hydrocarbons, and this is diluted with a second stream of carrier gas before passing the mixture of gases into the flame. The second stream of carrier gas is pre-heated, typically by passage through a tube in or above the HHW, before being mixed with the first stream containing HHW vapour. The first stream of carrier gas can pass over the surface of the heated HHW, or, preferably, be bubbled through the molten material. In the latter case a high and reproducible level of saturation of the stream with HHW vapour can be achieved.

The embodiment described above can be readily applied to single component HHW or to mixtures containing compounds of similar vapour pressure. A more preferred embodiment of flash vaporization provides control of the rate of feeding the HHW vapour and is particularly useful when the HHW contains compounds of widely differing vapour pressure.

In the flash vaporization technique the molten or liquid HHW is fed at a controlled rate into a heated vaporizer maintained at a temperature at or above 300° C. The HHW vapour is then carried to the flame by a stream of pre-heated hydrogen.

The nature of the construction material of the vapourizer is fairly critical in that some materials, for example, stainless steel, may lead to decomposition of the HHW to form carbon. A preferred construction material is mild steel.

The purity of the oxygen gas used in our process is not narrowly critical but should contain at least 40% w/w oxygen and preferably at least 90% w/w oxygen. Air is not suitable since it does not provide a stable flame without soot formation.

The burning means may comprise, for example, a relatively simple burner such as an arrangement of concentric pipes with the carrier gas/HHW vapour passing through the inner tube and oxygen through the outer tube. The hydrogen/HHW mixture will then burn within a sheath of oxygen to give a laminar flame.

Since the combustion of our process takes place inside a flame only a short-residence time is needed for complete destruction of the HHW. A relatively small combustion chamber will thus handle a large quantity of HHW on a continuous feed basis. The start-up time for the process is minimal and hence intermittent operation is equally feasible where this is required by the variation in the HHW available for disposal.

Suitable burners can be readily constructed and are inexpensive. The combustion chamber can be fabricated from any suitable metal provided that cooling is adequate and the reactant gases are kept above their dew point. Other suitable materials are carbon and quartz.

Hydrogen/oxygen flames typically have a temperature in the vicinity of 2700° C. However, when the heavy halogenated wastes are burnt in this flame the temperatures is lower and may be as low as 2000° C. With small-scale equipment air cooling of the combustion chamber surrounding the flame may be adequate for the temperatures reached. For larger-scale equipment cooling means will probably be necessary and suitable equipment will be obvious to those skilled in the art.

It is a feature of our process that in the complete combustion of the HHW an excess of hydrogen relative to the HHW ensures that all of the halogen is converted to hydrogen halide. This hydrogen halide may be simply removed by a water scrubber but is preferably recovered for further use. For example, with suitable collection means the hydrogen chloride from heavy chlorinated wastes can be virtually completely recovered as concentrated or fuming hydrochloric acid. The other combustion products from our process are carbon dioxide and water.

BEST MODE OF CARRYING OUT THE INVENTION

We also provide apparatus for carrying out the process of our invention. Preferred embodiments of the process and apparatus of the invention are now illustrated with reference to the accompanying drawings. However, it is to be understood that the following description is by way of example only and the process and apparatus of the invention is not to be construed as restricted to these preferred embodiments.

Figure 1:
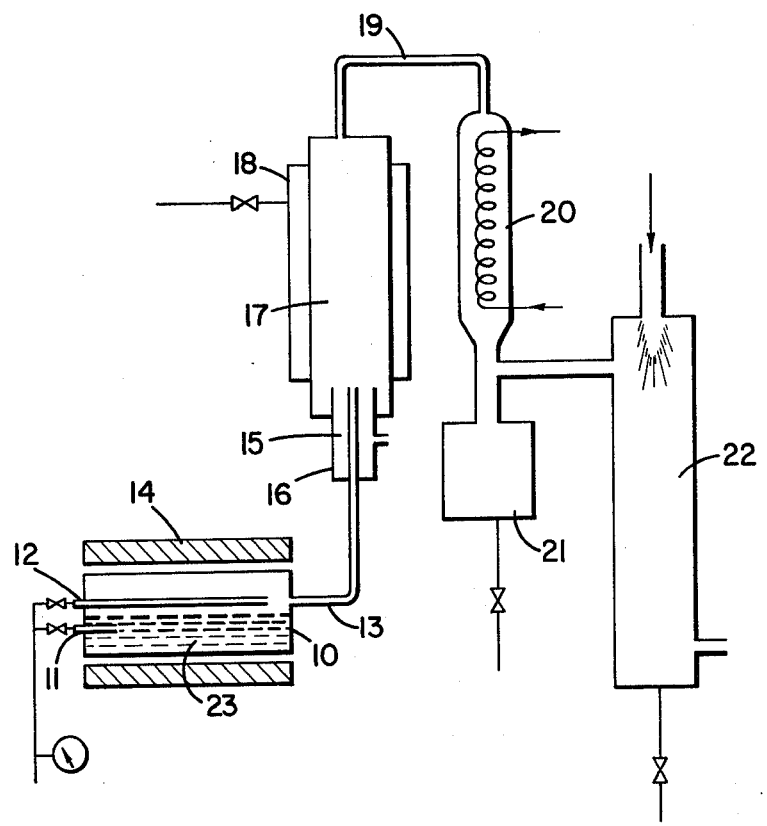
FIG. 1 shows a schematic view of an embodiment of the apparatus wherein the carrier gas comprising hydrogen is passed over heated HHW and the HHW/hydrogen vapour is burnt in a hydrogen/oxygen flame.
Figure 2:
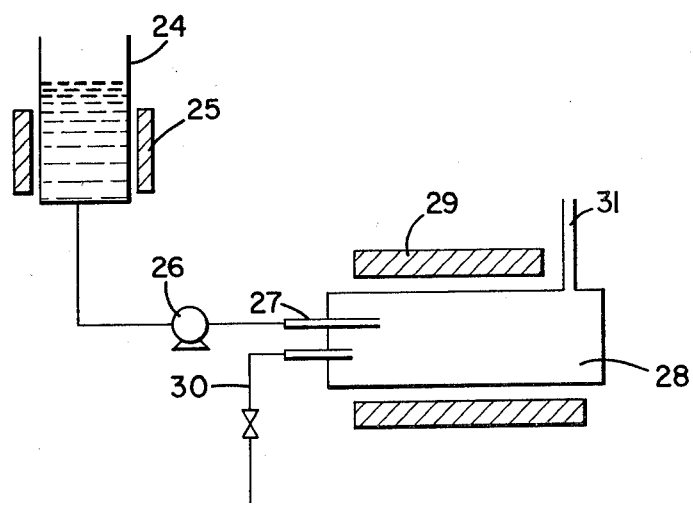
FIG. 2 shows a schematic view of an embodiment of the apparatus wherein the HHW is first heated and passed into a flash vaporizer with hydrogen before being burnt in a hydrogen/oxygen flame.
Figure 3:
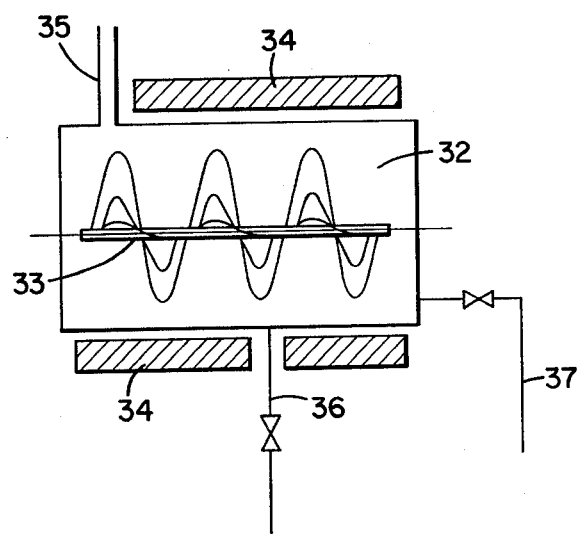
FIG. 3 shows a schematic view of a vessel with ribbon type mixer for preheating the HHW prior to vaporization.

It should be noted that FIGS. 1 to 3 are not drawn to scale and the relative dimensions and proportions of some parts of these Figures have been shown enlarged or reduced for the sake of clarity and convenience.

Referring to the drawings, FIG. 1 shows a vaporizer 10 comprising a vessel with entry tubes 11 and 12, and heating furnace 14. The vaporizer 10 is connected by outlet tube 13 to burner 15 bearing an entry tube 16 which is concentrically disposed around the tube 13. The burner 15 is attached to a combustion chamber 17 within cooling means 18. The combustion chamber 17 is connected by an outlet tube 19 to a water-cooled condensation column 20 equipped with a receiver 21 and a water or optionally an aqueous sodium hydroxide scrubber 22.

In operation the heavy halogenated wastes 23 are placed in the vaporizer 10 and heated by the furnace 14. A first stream of hydrogen is fed into the vaporizer 10 by means of inlet tube 11 and bubbled through or passed over the molten HHW 23 before leaving the vaporizer 10 by tube 13 to the burner 15. A second stream of hydrogen passes through tube 12 so as to enter the vaporizer 10 close to the entrance of the tube 13. Both hydrogen streams are preheated by coiling the tubes 11 and 12 around a heated block (not shown in FIG. 1).

Oxygen is fed to the burner 15 through the tube 16 to produce the flame in combustion chamber 17. The HHW is combusted in the hydrogen/oxygen flame in combustion chamber 17 and the hot combustion products pass through tube 19 to the water-cooled condenser 20. The condensed products are collected in the receiver 21 and the noncondensed products, mainly carbon dioxide and oxygen, are passed through the scrubber 22.

FIG. 2 shows a heating vessel 24 with heating furnace 25 connected via a metering pump 26 and tube 27 to a flash vaporization chamber 28 fitted with heating means 29, an inlet tube 30 and outlet tube 31. The HHW is heated in the vessel 24 and the molten HHW is delivered to the heated vaporization chamber 28 via the pump 26 which can be operated to accurately control the rate of addition of HHW. A stream of preheated hydrogen is admitted to the vaporizer through inlet tube 30 and the mixture of HHW vapour and hydrogen is passed through outlet tube 31 to a burner.

FIG. 3 shows a heating vessel 32 fitted with a horizontal ribbon type mixer 33. The vessel 132 is heated with a furnace 34 and has an inlet port 35, an outlet tube 36, and a discharge port 37. In operation the HHW is introduced through the inlet port 35 into the heated vessel 33. The HHW melts and is forced by the ribbon mixer 33 along the unit to the outlet tube 36. The ribbon mixer 33 assists in heat transfer and also transfers unmelted residues to the vicinity of the discharge port 37 from time to time, thus avoiding contamination of the rest of the apparatus.

INDUSTRIAL APPLICABILITY

In contrast to the prior art methods of incineration our process provides a highly efficient combustion of the heavy halogenated wastes. Destruction efficiencies of higher than 99.999% can be ready achieved. This process, therefore, will meet the environmental requirements for waste disposals for most countries.

A further advantage of our process is that the only HHW materials handling required is the transport of the cold waste from the plant or store to the melting unit and vaporizer which were described hereinbefore. It is also possible to construct a unit of such a size that it is sufficiently portable to be moved between the various plants or stores where the HHW are generated or held.

Some HHW, for example, hexachlorobenzene, are solids and are practically insoluble in conventional solvents. Loading such solids into conventional incinerators is technically very difficult and hazardous. Introduction of such material into the burner of our process in the form of a vapour greatly reduces the materials handling requirement.

If the hydrogen halides produced are not required for further use, the concentrated acid solutions produced from our process are more readily neutralized and eliminated as liquid effluent than the very dilute acid solutions of the prior art incinerators. The use of hydrogen as a carrier gas ensures a minimum volume of non-condensable vent gas and thus reduces the size of the hydrogen halide scrubber required.

The process of our invention is now illustrated by but not limited to the following examples in which all parts and percentages are by weight unless otherwise specified.

EXAMPLE 1

A sample of technical hexachlorobenzene (HCB) was combusted in the apparatus described above with reference to FIG. 1. The experimental conditions were:

| | |
|---|---|
| Temperature of vaporizer | 230° C. |
| Temperature of pre-heated hydrogen streams | 250° C. |
| Combined hydrogen flow rate | 2.8 1/min |
| Oxygen flow rate | 1.8 1/min |
| (Excess $O_2$ was maintained at all times) | |

About 1000 g of HCB was placed in the vaporizer. All the connecting tubings were heated to 250° C. to prevent condensation of HCB. During the burning, fuming concentrated hydrochloric acid was collected in the receiver. The flame was bright and luminous.

The experiment was run for six hours. Analyses were carried out for the amount of hydrogen chloride (HCl) found and the carbon dioxide ($CO_2$) scrubbed in the caustic solution. Unreacted HCB in the condensate, caustic scrubbing solution and the cold trap was quantified by a gas chromatographic method.

The final results were:

| | |
|---|---|
| Weight of HCB burnt = | 540 g |
| Rate of burning = | 1.5 g/min |
| Total volume of condensate = | 568.4 ml |
| Total amount of HCl formed = | 416.0 g |
| Equivalent chlorine content = | 404.6 g |
| Amount of $CO_2$ scrubbed = | 502.2 g |

The amount of uncombusted HCB was 30 µg, corresponding to a destruction efficiency of 99.9999%.

The flame temperature was calculated to be around 2,500° C. and the residence time 0.08 sec.

The second stream of hydrogen was used to control the saturation of HCB in the hydrogen carrier to the burner. About 80% v/v HCB saturation was achieved and no blockages occurred in the lines under this condition.

EXAMPLE 2

A sample of crude hexachlorobenzene having the following composition was used:

| | | Chlorine content | |
|---|---|---|---|
| Components | % w/w | % w/w component | % w/w in sample |
| Hexachlorobenzene (HCB) | 51.0 | 74.7 | 38.1 |
| Hexachlorobutadiene (HCBD) | 8.3 | 81.6 | 6.8 |
| Hexachloroethane (HCE) | 39.6 | 89.9 | 35.6 |
| Octachlorostyrene (OCS) | 0.5 | 74.7 | 0.4 |
| Octachlorobutene (OCB) | 0.3 | 85.5 | 0.2 |
| Carbon | 0.2 | — | — |
| | 100 | | 81.1 |

Similar apparatus and experimental conditions as described in Example 1 were used except that the vaporization temperature could be reduced to 180° C. instead of 230° C. because of the impurities present. The experiment was run for 4.5 hours and reacted chlorinated compounds were analyzed by the same GC method.

| | |
|---|---|
| Weight of crude HCB burnt = | 400 g |
| Rate of burning = | 1.5 g/min |
| Total volume of condensate = | 603.5 ml |
| Amount of HCl formed = | 323.9 g |
| Equiv. chlorine content = | 315.0 g |
| Amount of $CO_2$ scrubbed = | 296.3 g |

The amount of uncombusted chlorinated wastes was as follows:

| | |
|---|---|
| HCE | 5.1 µg |
| HCBD | 8.7 µg |
| HCB | 7.3 µg |
| Total | 21.1 µg |

This is equivalent to a destruction efficiency of 99.9999%.

This example shows that the impurities in HCB such as OCS, HCE and HCBD also react quantitatively to HCl and $CO_2$.

EXAMPLE 3

A commercially available sample of polychlorinated biphenyls bearing the registered trade mark of "Kannechlor" was used. An elemental analysis indicated the following composition:

| | % w/w |
|---|---|
| Carbon | 41.9 |
| Hydrogen | 1.54 |
| Chlorine | 56.6 |
| Nitrogen | 0.09 |

Similar apparatus and experimental conditions as described in Example 1 were used with the exception of the control of vaporization temperature. Three stages of vaporization temperature were involved.

(1) Above 106° C. a bright flame started and persisted until the temperature reached 160° C.
(2) From 160° C.–200° C. a very small luminous flame was observed.
(3) From 200° C.–288° C. a bright steady flame resulted.

This was related to the heterogenous nature of the sample. The experiment lasted for five hours. All samples of "Kannechlor" vaporized below 290° C.

| | |
|---|---|
| Weight of "Kannechlor" burnt = | 92.1 g |
| Rate of burning = | 0.3 g/min |
| Amount of condensate = | 524 ml |
| Amount of HCl formed = | 54.5 g |
| Chlorine content = | 53.0 g |

About 430 µg of unreacted polychlorinated biphenyls was detected in the combustion products corresponding to a destruction efficiency of 99.9995%.

EXAMPLE 4

The apparatus used for this example was that described hereinbefore with reference to FIGS. 2 and 3.

A commercial sample of perchlorobiphenyls (PCBs; sold under the registered trade mark 'Askerel') was used. Elemental analysis indicated the following composition.

|  | % w/w |
|---|---|
| Carbon | 42.2 |
| Hydrogen | 1.53 |
| Chlorine | 56.4 |
| Nitrogen | 0.08 |

The sample was heated until molten and delivered to the heated flash vaporizer via the metering pump. The experimental conditions were as follows:

| Temperature of melting vessel | 70° C. |
|---|---|
| Temperature of hydrogen preheater | 300° C. |
| Temperature of oxygen preheater | 300° C. |
| Hydrogen flow rate | 1.7 l/min |
| Oxygen flow rate | 2.1 l/min |
| Pump rate | 0.71 g/min |

The experiment was run for 40 minutes and a total of 28.4 g PCB's was burnt. The flame was bright and steady. The final results were:

| Amount of condensate | 61 ml |
|---|---|
| Amount of HCl formed | 16.5 g |
| Chlorine content | 16.0 g |
| % Chlorine calculated | 56.3% |

About 980 µg of unreacted PCB's was detected in the combustion products corresponding to a destruction efficiency of 99.997%. Using gas chromatography (electron capture detector) for quantification and gas chromatography/mass spectroscopy for identification, no toxic tetrachlorodibenzodioxins were detected at a level of approximately 60 nanogram/gram PCB's.

We claim:

1. A process of thermal destruction of solid meltable heavy halogenated waste characterized in that a pre-heated mixture of heavy halogenated waste vapour and a carrier gas comprising at least 80% v/v hydrogen is burnt in a hydrogen/oxygen flame wherein the gaseous oxygen fed to the flame has an oxygen content of at least 40% w/w, and wherein the pre-heated mixture is formed by heating the heavy halogenated waste until molten and passing it concurrently with a quantity of carrier gas containing sufficient hydrogen for complete conversion of the heavy halogenated waste to hydrogen halide into a vaporization chamber maintained at or above 300° C.

2. A process according to claim 1 wherein the heavy halogenated wastes comprise chlorinated aromatic wastes.

3. A process according to claim 2 wherein the chlorinated aromatic wastes comprise hexachlorobenzene.

4. A process according to claim 2 or claim 3 wherein the chlorinated aromatic wastes comprise a compound from the group consisting of polychlorinated biphenyls and octachlorostyrene.

5. A process according to claim 1 wherein the heavy halogenated wastes comprise chlorinated aliphatic wastes.

6. A process according to claim 5 wherein the chlorinated aliphatic wastes comprise a compound selected from the group consisting of hexachloroethane, perchloroethylene, hexachlorobutadiene and octachlorobutene.

7. A process according to claim 1 wherein the carrier gas is hydrogen.

8. A process according to claim 1 wherein the heavy halogenated wastes are converted to vapour by heating to a temperature above 106° C. and passing carrier gas through or over the surface of the heated halogenated wastes.

9. A process according to claim 1 wherein the carrier gas is preheated before contact with the heavy halogenated wastes.

10. A process according to claim 1 wherein the burning means comprises a central tube for passage of the said mixture of vapour of the heavy halogenated wastes and carrier gas surrounded by a substantially concentric tube for the passage of gaseous oxygen.

11. A process according to claim 1 wherein the halogen from the heavy halogenated wastes is recovered in a form comprising a hydrogen halide.

12. A process according to claim 11 wherein the hydrogen halide is hydrogen chloride.

13. A process according to claim 1 wherein at least 99.997% w/w of the heavy halogenated wastes is destroyed.

14. A process according to claim 13 wherein at least 99.999% w/w of the heavy halogenated wastes is destroyed.

15. A process according to claim 1 wherein the gaseous oxygen has an oxygen content of at least 90%.

* * * * *